(12) United States Patent
Sheynblat et al.

(10) Patent No.: US 8,826,188 B2
(45) Date of Patent: Sep. 2, 2014

(54) PROXIMITY SENSOR CALIBRATION

(75) Inventors: Leonid Sheynblat, Hillsborough, CA (US); Chenna Bayapureddy, Sunnyvale, CA (US); Kyoung Cheol Oh, Danville, CA (US)

(73) Assignee: Qualcomm Incorporated, San Diego, CA (US)

( * ) Notice: Subject to any disclaimer, the term of this patent is extended or adjusted under 35 U.S.C. 154(b) by 264 days.

(21) Appl. No.: 13/218,777

(22) Filed: Aug. 26, 2011

(65) Prior Publication Data
US 2013/0049641 A1 Feb. 28, 2013

(51) Int. Cl.
*G06F 3/048* (2013.01)
*G06F 3/033* (2013.01)

(52) U.S. Cl.
USPC .......................................... 715/862; 715/863

(58) Field of Classification Search
CPC .............. G06F 1/3231; G06F 3/04842; G06F 3/04812; G06F 3/0481; G06F 3/038; G06F 3/0482; G06F 3/017; G06F 3/0488; Y02B 60/1289
USPC ............ 345/173; 250/349; 356/51; 715/862, 715/863
See application file for complete search history.

(56) References Cited

U.S. PATENT DOCUMENTS

| | | | |
|---|---|---|---|
| 3,778,157 A | 12/1973 | Brelot et al. | |
| 5,543,918 A | 8/1996 | Abraham et al. | |
| 7,598,949 B2 | 10/2009 | Han | |
| 2008/0167834 A1* | 7/2008 | Herz et al. | 702/150 |
| 2009/0197615 A1 | 8/2009 | Kim et al. | |
| 2010/0124945 A1 | 5/2010 | Hwang et al. | |
| 2010/0245289 A1 | 9/2010 | Svajda | |
| 2010/0277075 A1 | 11/2010 | Rees | |
| 2010/0295781 A1* | 11/2010 | Alameh et al. | 345/158 |
| 2010/0299642 A1 | 11/2010 | Merrell et al. | |
| 2012/0162636 A1* | 6/2012 | Sy | 356/51 |

FOREIGN PATENT DOCUMENTS

| | | |
|---|---|---|
| EP | 0246130 A1 | 11/1987 |
| FR | 2399000 A1 | 2/1979 |
| GB | 2178840 A | 2/1987 |
| WO | 2009069121 A1 | 6/2009 |

OTHER PUBLICATIONS

International Search Report and Written Opinion—PCT/US2012/049722—ISA/EPO—Oct. 18, 2012.

* cited by examiner

*Primary Examiner* — Kevin M Nguyen
(74) *Attorney, Agent, or Firm* — Kilpatrick Townsend & Stockton LLP

(57) ABSTRACT

The subject matter disclosed herein relates to proximity sensors to measure distance from a surface, and more particularly, calibrating proximity sensors to adjust for various reflecting surfaces.

34 Claims, 5 Drawing Sheets

PROXIMITY SENSOR CALIBRATION

BACKGROUND

1. Field

The subject matter disclosed herein relates to proximity sensors to measure distance from a surface, and more particularly, calibrating proximity sensors to adjust for various reflecting surfaces.

2. Background

Mobile devices, such as smart cell phones or personal digital assistants (PDAs), may include a variety of features, including a digital camera, satellite positioning system (SPS) capability, a compass, and an ability to wirelessly connect to the Internet, among others. Often, mobile devices include keypads and/or displays that are backlit for easy viewing by a user. Unfortunately, backlighting may use a relatively large amount of battery power, which may be limited until a battery is recharged. Accordingly, backlighting may be powered off after a particular time period or if a mobile device is placed near a user's head, such as during a phone call or taking a photo using the mobile device.

BRIEF DESCRIPTION OF THE FIGURES

Non-limiting and non-exhaustive features will be described with reference to the following figures, wherein like reference numerals refer to like parts throughout the various figures.

SUMMARY

Figure 1:
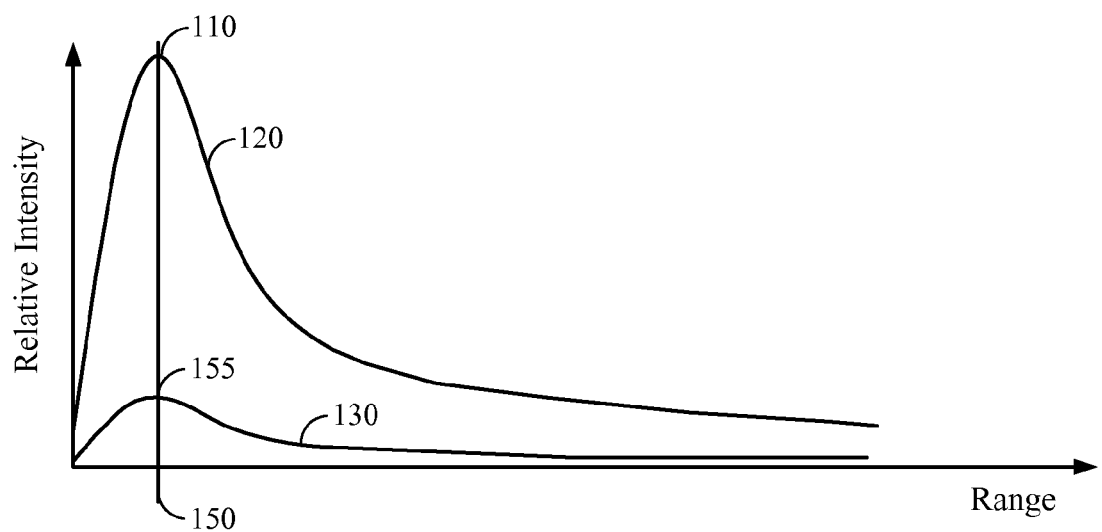
FIG. 1 includes plots showing relative reflection intensity as a function of distance to a surface, according to an implementation.

In an implementation, a method performed at a sensor may comprise detecting a peak intensity of a signal reflected against a surface, and approximating a function of a range from the sensor to the surface based, at least in part, on an application of the detected peak intensity to a reference curve. In another implementation, an apparatus may comprise a sensor to detect a peak intensity of a signal reflected against a surface, and a processor to approximate a function of a range from the sensor to the surface based, at least in part, on an application of the peak intensity to a reference curve. In yet another implementation, an apparatus may comprise, at a sensor, means for detecting a peak intensity of a signal reflected against a surface, and means for approximating a function of a range from the sensor to the surface based, at least in part, on an application of the detected peak intensity to a reference curve. In still another implementation, an article comprising a storage medium may comprise machine-readable instructions stored thereon that, in response to being executed by a special purpose computing device, are adapted to enable the special purpose computing device to: detect a peak intensity of a signal reflected against a surface and received at a sensor; and approximate a function of a range from the sensor to the surface based, at least in part, on an application of the detected peak intensity to a reference curve. It should be understood, however, that these are merely sample implementations provided for the purpose of illustration and that claimed subject matter is not limited in these respects.

DETAILED DESCRIPTION

Reference throughout this specification to "one example", "one feature", "an example" or "one feature" means that a particular feature, structure, or characteristic described in connection with the feature or example is included in at least one feature or example of claimed subject matter. Thus, the appearances of the phrase "in one example", "an example", "in one feature" or "a feature" in various places throughout this specification are not necessarily all referring to the same feature or example. Furthermore, the particular features, structures, or characteristics may be combined in one or more examples or features.

In an implementation, a mobile device (MD), which may comprise a cell phone, a PDA, a camera, or any combination thereof, for example, may include a proximity sensor to determine a distance from the MD to a reflecting surface. In particular, such a reflecting surface may comprise a portion of a face or head of a user of the MD. Accordingly, a MD may determine whether a MD is relatively close or relatively far from a portion of a user's face or head. A MD may incorporate a proximity sensor to measure distance or range to a reflecting surface based, at least in part, on a reflection intensity reference curve, as explained in detail below. Hereinafter, "reflection intensity reference curve" is abbreviated to "reference curve".

In a particular implementation, a MD may perform techniques to approximate a function of a range to a reflecting surface to account for various shades or colors of the reflecting surface, such as that of a user's skin color, for example. An approximation of a function of a range to a reflecting surface may be based, at least in part, on a detected peak intensity of a signal reflected against the surface. A peak intensity of such a signal may occur in response to detecting a physical touching of a surface against a sensor, for example. An ability to estimate or approximate a function of a range to a reflecting surface to account for color of the reflecting surface may provide an opportunity to improve accuracy of measuring distance between a sensor and the reflecting surface, for example.

In an implementation, determining a distance between a MD and a portion of a user's face or head may be useful for a number of applications. For example, battery power of a MD may be conserved by deactivating or powering off components of a user interface, such as backlighting of a display and/or keypad of the MD while the MD is not visible to a user, such as during a phone call or while a user is taking a photo or recording a video. For a specific example, a MD may include electronics to deactivate or power off backlighting if the MD is within 5.0 centimeters from a reflecting surface (e.g., any portion of a user's head). However, this is merely an example of an application of a measured distance obtained using techniques as described, and claimed subject matter is not so limited.

In an implementation, a proximity sensor may comprise an emitter and a receiver to form an active sensor. In a particular example, a proximity sensor may comprise an emitter such as an infrared (IR) light emitting diode (LED) or IR laser diode, and a receiver such as an IR detector, IR sensor, and/or photodiode, though claimed subject matter is not so limited to these particular examples. A detector may measure at least a portion of IR power or intensity reflected from a reflecting surface. To measure distance to the reflecting surface, an electronic signal representing measured IR power or intensity may be converted to represent distance according to a reference curve, as explained in further detail below. Such a reference curve, which may be associated with a particular MD, may be used to approximate a particular function of the particular MD for a particular reflecting surface. A reference curve may define a relationship between intensity of energy reflected and received from a surface and a range from a sensor to the surface.

A reference curve may represent behavior of a detector or sensor relative to a particular reflecting surface. For example, a relatively large distance may result in a relatively small amount of measured IR power while a relatively small distance may result in a relatively large amount of measured IR power. Unfortunately, accuracy of distance measurements based on a reference curve may depend, at least in part, on physical properties of a reflecting surface, such as reflectivity. Color, shading, and texture are some examples of surface features that may contribute to reflectivity of the surface. Reflectivity of a surface is defined as a ratio or percentage of the intensity of reflected light to the intensity of incident light.

FIG. 1 includes plots 120 and 130 which may express a relationship between received power of a reflection signal and range to a reflecting surface, according to an implementation. Plots 120 and 130, for example, may be used to approximate a function of received reflected power versus distance between a MD and a surface having a particular reflectivity. Such a relationship between power received from a reflecting signal and range to a reflecting surface may be expressed as a mathematical plot, a look-up table, one or more algebraic expressions, or any combination thereof, for example. In an implementation, a reflection signal may be produced by a photo-detector in response to light reflected from a surface impinging on the photo-detector, for example. Plot 120 may have a particular shape that includes a peak value 110. For example, a portion of plot 120 greater than range 150 may represent a pattern of a function that decreases proportional to the inverse square of range. Other portions of plot 120, however, need not represent a particular pattern. This portion of plot 120 may represent a response of an infrared sensor to received power of a signal reflected against a surface, for example. On the other hand, a portion of plot 120 less than range 150 may represent a particular function that increases from a relatively small magnitude to peak value 110 as range increases. This portion of plot 120 may represent the response of an infrared sensor measuring ranges to a reflecting surface less than peak value 110. This particular response may depend, at least in part, on a distance between an IR emitter that emits an IR signal toward a surface and an IR sensor that measures a returning reflected IR signal.

Plot 130 may have a similar shape or features as described above for plot 120, though a peak value of plot 130 is less than that of plot 120. For example, a portion of plot 130 over ranges beyond range 150 may represent a function that decreases proportionally with the inverse square of range. On the other hand, a portion of plot 130 below range 150 may represent a particular function that increases from a relatively small magnitude to peak 155 as range increases. This portion of plot 130 may represent a response of an infrared sensor to a reflecting surface being at a range of less than range 150. For example, plot 120 may represent received power of an IR signal reflected from a surface having a relatively high reflectivity, whereas plot 130 may represent received power of an IR signal reflected from a surface having a relatively low reflectivity. Different colors of a reflecting surface, for example, may lead to different reflectivities.

As shown in FIG. 1, a peak value occurs at about range 150 for both plots 120 and 130. A peak value may occur at a particular range from a reflecting surface, wherein the particular range may be substantially independent of a color of the reflecting surface. In a particular example, range 150 may comprise a value of about 5.0 to about 7.0 mm, though claimed subject matter is not so limited. In one particular implementation, the range at which such a peak occurs may be determined, at least in part, on a separation between detector and emitter of a proximity sensor. Thus, a range at which such a peak occurs may be substantially the same for surfaces of different reflectivity if a separation between IR emitter and IR sensor does not change.

As pointed out above, plots 120 and 130 may have peak values that are different from one another. Such peak value differences may be a result of different reflectivities of reflecting surfaces associated with plots 120 and 130.

In a particular implementation, a reference curve associated with a particular MD, may approximate a particular function of received reflected power versus distance between the particular MD and a surface having a particular reflectivity. Though a particular reference curve may represent behavior of a sensor relative to a surface having a particular reflectivity, the particular reference curve may fall short of accurately representing another reflecting surface. In other words, using a particular reference curve in a process of determining a distance to a reflecting surface may be acceptable if the surface has a reflectivity in a first range of values. But using the same particular reference curve to measure a distance from reflecting surfaces having other reflectivities may lead to inaccurate distance measurements. In terms of color or shade of skin of a user of a MD, for example, a particular reference curve may be useful in a case of relatively light skin while using the same particular reference curve for a user having relatively dark skin may lead to inaccurate distance measurements. Thus, to address possible shortcomings of using a particular reference curve, as discussed above, a MD may be capable of estimating a new reference curve or function for a reflecting surface based, at least in part, on detecting a peak intensity value of a signal from an infrared sensor against the reflecting surface.

Figure 2:
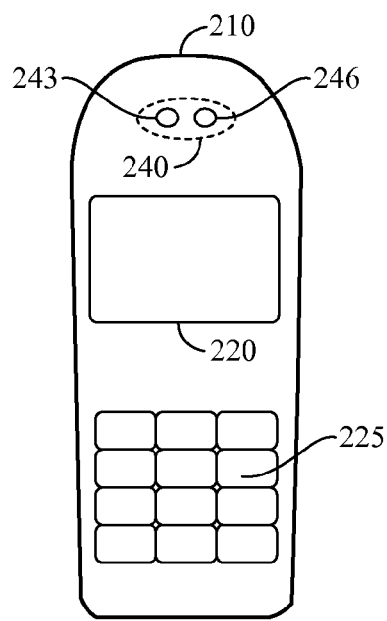
FIG. 2 is a perspective view showing a mobile device, according to an implementation.

FIG. 2 is a schematic diagram showing a mobile device 210, according to an implementation. MD 210 may include a proximity sensor 240 and/or a special purpose processor to host one or more applications, as described in greater detail below. MD 210 may include one or more user interfaces such as keypad 225 or display 220, which may comprise a touch screen, for example. Proximity sensor 240 may comprise an emitter 243 and a detector 246. Of course, such details of a mobile device are merely examples, and claimed subject matter is not so limited.

Figure 3:
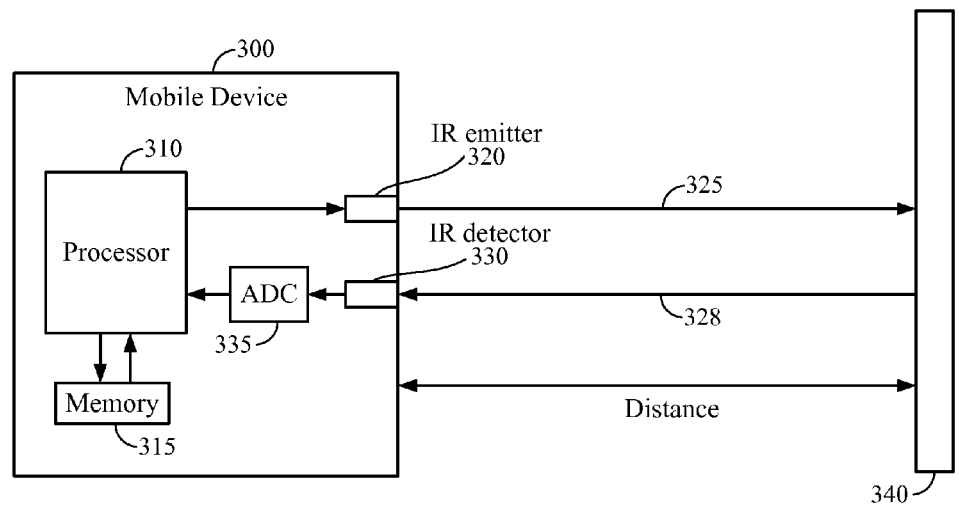
FIG. 3 is a block diagram of a mobile device to measure a distance to a surface, according to an implementation.

FIG. 3 is a schematic diagram showing a mobile device 300 capable of measuring a distance to a reflecting surface 340, according to an implementation. MD 300 may comprise an IR emitter 320, IR detector 330, analog-to-digital converter (ADC) 335, processor 310, and/or memory 315. IR emitter 320 may emit an IR signal 325 having a particular intensity. At least a portion of IR signal 325 may be reflected by surface 340. Such reflection is represented by reflection signal 328 in FIG. 3. A portion of reflection signal 328 may be collected or received by IR detector 330, which may respond by generating an electronic signal having a magnitude proportional to the intensity of the received reflection signal 328. In a particular implementation, ADC 335 may receive such an electronic signal to convert the analog electronic signal to a digital signal provided to processor 310. In one implementation, processor 310 may compare the intensity of the measured reflection signal 328 to the particular intensity of the emitted IR signal 325. Memory 315 may be used to store, among other things, one or more reference curves, distance information, and/or ADC signal information.

If the reflectivity of surface 340 is known, then distance to the surface may be measured by using a known reference curve corresponding to the known reflectivity. If the reflectivity of surface 340 is not known, however, then a new reference curve may be determined and used to measure a distance to surface 340. A new reference curve may be determined from a known reference curve: Determining a new reference curve may comprise measuring a peak value of a signal of an infrared sensor measuring power of a signal reflected from surface 340 and received at a detector. A new reference curve may be determined based, at least in part, on a measured peak value by determining a proportionality constant between the measured peak value and the peak value of a known reference curve. A new reference curve may be determined, for example, by scaling values of a known reference curve by such a proportionality constant. In one implementation, detecting a peak value of a signal of an infrared sensor measuring power or intensity of a signal reflected from surface 340 may involve sampling power or intensity of the signal multiple times while a range to surface 340 is varied. After using a peak value to determine a new reference curve representative of the reflectivity of surface 340, distance to surface 340 may be determined using the new reference curve. Of course, such details of determining distance are merely examples, and claimed subject matter is not so limited.

Figure 4:
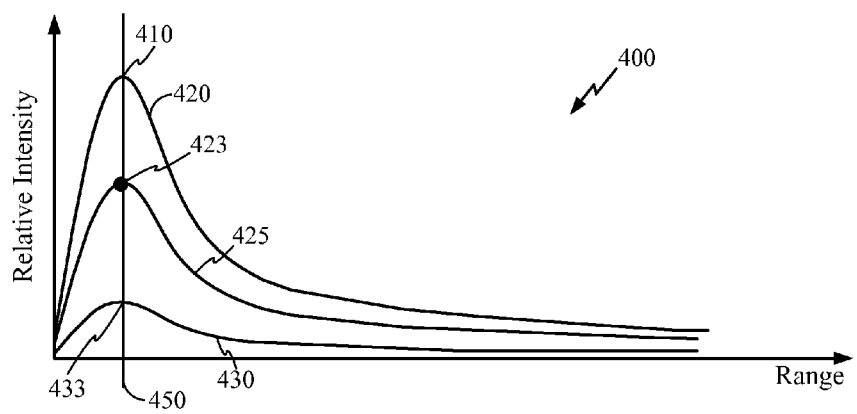
FIG. 4 includes plots showing relative reflection intensity as a function of distance to a surface, according to an implementation.

FIG. 4 includes plots 400 of relative intensity as a function of range to a surface, according to an implementation. A reference curve 420 may be generated or measured during a calibration process during manufacture of a MD. Reference curve 420 may be generated using a particular reflectivity of a "baseline" reflecting surface. At a later time, if the MD is to measure a distance from a surface having a reflectivity different from that of the baseline reflecting surface, a new reference curve 425 may be determined. Such a new reference curve may be determined using a peak value 423. Peak value 423 may be measured by any of a number of techniques, as explained below (e.g., using processes 700 or 800). Reference curve 420 may be stored in memory 315 (FIG. 3). In a particular implementation, another reference curve 430, which may have a peak magnitude smaller than that of reference curve 420, may also be stored in memory 315. A process to generate or estimate a new reference curve from its peak value is described below.

As discussed above, a new reference curve may be determined using a known reference curve by scaling values of the known reference curve by a proportionality constant. Such a proportionality constant may comprise a ratio of a peak value of a known reference curve to a measured peak value of a new reference curve (to be determined). Thus, for example, once a ratio of peak value 423 to peak value 410 is determined, a new reference curve 425 may be determined using reference curve 420, which may be stored. A range at which peak value 423 occurs need not be known, though it may be inferred that this range would also correspond with peak value 410 of stored reference curve 420, which is range 450 as shown in FIG. 4. In an implementation, another stored reference curve 430 may be used in place of stored reference curve 420 to determine new reference curve 425. A selection of one or another stored reference curve may be based, at least in part, on which particular stored reference curve has a peak value (e.g., peak value 410 or 433) most closely matching a measured peak value (e.g., peak value 423). Selection of a reference curve having a peak value most closely matching a measured peak value may enable improved accuracy of a new reference curve. Of course, such details and properties of reference curves are merely examples, and claimed subject matter is not so limited.

Figure 5:
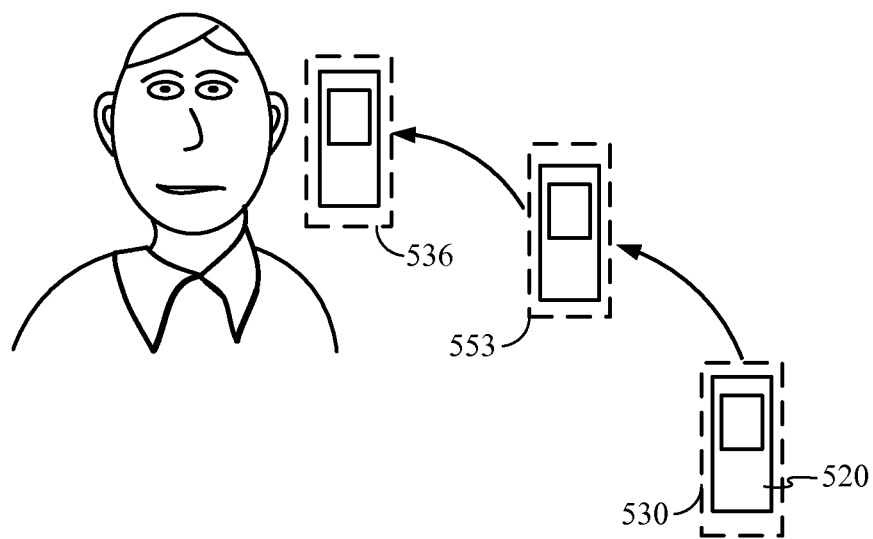
FIG. 5 is an image representing various positions of a mobile device relative to a user, according to an implementation.

FIG. 5 is an image representing various positions of a mobile device 520 relative to a user, according to an implementation. MD 520 may determine peak intensity of reflected IR light received, such as peak value 423 shown in FIG. 4 for example, by iteratively measuring reflected intensity as a position of MD 520 is transitioned from a relatively far distance (e.g., more than a few centimeters) to a relatively near distance (e.g., a few millimeters or so) with respect to a reflecting surface. In one implementation, a MD may be moved from a relatively far distance to a relatively near distance with respect to a user's face or head. Such a movement of the MD may occur, for example, as a user picks up a cell phone to answer or to make a call. To illustrate, a MD 520 may be located at position 530, which may comprise a location such as a table top, a pocket, a pack or handbag, for example. Position 530 may be located relatively far away from a head or face of user 500. As a user lifts up MD 520, the position of MD 520 may transition from position 530 to a relatively near position 536, which may be located within a few millimeters of a user's ear, for example. During such a position transition, MD 520 may be located at interim positions 533. Also during such a position transition, MD 520 may perform a plurality of measurements to determine peak in intensity of a reflected signal as received by an IR detector. At a particular interim position 533, such a peak in intensity of a reflected signal as received by an IR detector may occur. A distance from user 500 at which such a peak in intensity of a reflected signal as received by an IR detector occurs is not known a priori. However, the value of the peak reflected intensity may be used to derive a new reference curve, from which distances between user 500 and MD 520 may then be determined.

Figure 6:
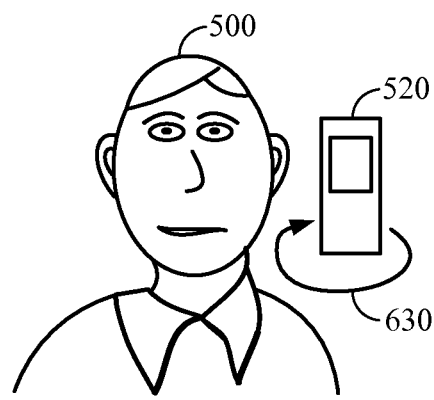
FIG. 6 is an image representing various positions of a mobile device relative to a user, according to another implementation.

FIG. 6 is an image representing various positions of mobile device 520 relative to a user, according to another implementation. MD 520 may determine peak in intensity of a reflected signal as received by an IR detector, such as peak value 423 shown in FIG. 4, for example, by iteratively measuring reflected intensity as a position of MD 520 is randomly moved about a region near user 500. For example, motion 630 may result in MD 520 randomly moving nearer and closer to the head, ear, or face of user 500. Such a situation may occur, for example, as a user talks on a cell phone over an extended period of time, such as a minute or more. During motion 630, MD 520 may perform a plurality of measurements to determine peak in intensity of a reflected signal as received by an IR detector. As mentioned above, the value of the peak in intensity of a reflected signal as received by an IR detector may be used to calculate a new reference curve, from which distances between user 500 and MD 520 may be determined.

Of course, such actions of a user or motions of a MD are merely examples, and claimed subject matter is not limited in this respect.

Figure 7:
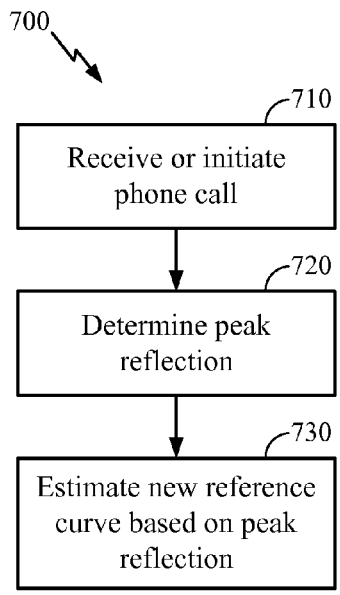
FIG. 7 is a flow diagram of a process to generate a reference curve, according to an implementation.

FIG. 7 is a flow diagram of a process 700 to estimate a reference curve, according to an implementation. For example, process 700 may be used to generate or estimate reference curve 425 using peak value 423 and a stored reference curve such as reference curve 420 or 430. Process 700 may be initiated in response to any of several conditions or events. In particular, an action that involves a user placing a MD near the user's head or face from a relatively far position (or vise versa) may be useful for performing process 700 to, for example, initialize the MD with a new reference curve. Also, it may be desirable to perform process 700 from time to time or for a change in users, for example. In one particular implementation, a MD may automatically, and without user involvement, perform 700. In contrast, in another particular implementation, a user may initiate a process (e.g., process 800, discussed below) to estimate a reference curve. One example of initiating process 700 is described in block 710, where a MD receives or makes a phone call. For example, MD 520 receiving a phone call may prompt user 500 to pick up MD 520 from a position 530 and bring MD 520 to the user's ear, as shown in FIG. 5. In another example, user 500 making a phone call may move MD 520 in a motion 630 about a region of the user's head or face, as shown in FIG. 6, while user 500 dials a phone number on MD 520 and then listens to the consequent phone call. In any of these examples, MD 520 may obtain a plurality of measurements of intensity of reflection from the head and/or face of user 500 during motion of MD 520. As explained above, performing a plurality of intensity measurements may enable a reliable determination of a peak reflection intensity value for use in estimating a new reference curve.

At block 720, a MD may perform a process to determine peak in intensity of a reflected signal as received by an IR detector as the MD is moved from one location relatively near a reflecting surface to relatively far from the reflecting surface. Details of a process to determine peak reflection intensity in block 720 are discussed below for process 1020 shown in FIG. 10. At block 730, a MD may perform a process to estimate a new reference curve based, at least in part, on the peak reflection intensity determined in block 720. Details of such a process are discussed below for process 930 shown in FIG. 9.

Figure 8:
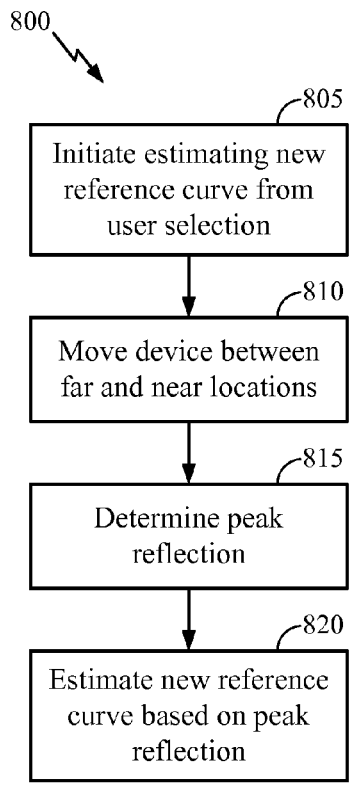
FIG. 8 is a flow diagram of a process to generate a reference curve, according to another implementation.

FIG. 8 is a flow diagram of a process 800 to estimate a reference curve for an MD, according to another implementation. For example, as for process 700 described above, process 800 may be used to estimate or calculate reference curve 425 for an MD using peak value 423 and a stored reference curve such as reference curve 420 or 430. It may be desirable to perform process 800 from time to time or if a new user is to use MD, for example. Process 800 to estimate a reference curve may be initiated in response to any number of conditions or events. In one particular implementation, a user may initiate process 800 by selecting to do so via a user interface of a MD, as in block 805. At block 810, subsequent to the user selecting to perform process 800, the user may move the MD between locations that are relatively far and near to the user's head or face. During such movements of the MD, the MD may perform a sequence of measurements of intensity of received IR light reflected from the head and/or face of the user. As explained above, performing a sequence of measurements of reflected intensity may enable a determination of a peak reflection intensity value that may be used to determine a new reference curve.

At block 820, the MD may perform a process to determine peak in intensity of a reflected signal as received by an IR detector as a result of the MD moving from one location relatively near a reflecting surface to relatively far from the reflecting surface. Details of a process to determine peak in intensity of a reflected signal as received by an IR detector in block 820 are discussed below for process 1020 shown in FIG. 10. At block 830, a MD may perform a process to estimate a new reference curve based, at least in part, on the peak reflection intensity determined in block 820. Details of such a process are discussed below for process 930 shown in FIG. 9.

Figure 9:
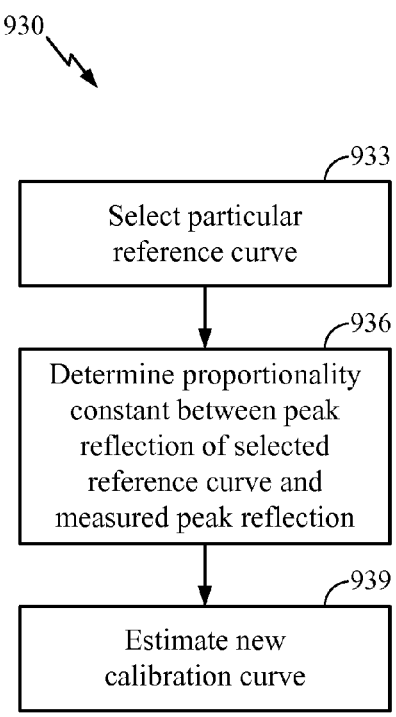
FIG. 9 is a flow diagram of a process to generate a reference curve, according to yet another implementation.

FIG. 9 is a flow diagram of a process 930 to estimate a reference curve, according to an implementation. For example, process 930 may be similar to a process performed at block 730 of process 700 or at block 830 of process 800, for example. Process 930 may be used to estimate or calculate reference curve 425 using peak value 423 and a stored reference curve such as reference curve 420 or 430, shown on FIG. 4. In a particular implementation, a measured peak value may have been obtained in advance of process 930. In particular, such a measured peak value may already have been determined at block 720 of process 700 or at block 820 of process 800, for example. At block 933, a particular reference curve may be selected from among a number of reference curves stored in memory. For example, such a particular reference curve may be estimated or measured during a calibration process during manufacture of a MD using a particular reflectivity of a "baseline" reflecting surface. One stored reference curve may be used in place of another stored reference curve to determine a new calculated reference curve. As explained above, a decision to use one or another stored reference curve may be based, at least in part, on which stored reference curve has a peak value more closely matching that of a measured peak value. Such a decision may enable an improved accuracy of a new calculated reference curve. At block 936, the MD may determine a ratio of the peak value of the selected reference curve to the measured peak value. Such a ratio or quotient may comprise a proportionality constant that may be used to scale the selected reference curve to calculate a new reference curve, as at block 939. For example, referring to FIG. 4, the MD may determine a ratio of the peak value 410 of the selected reference curve 420 to the measured peak value 423. Of course, such details of process 930 to estimate a reference curve are merely examples, and claimed subject matter is not so limited.

Figure 10:
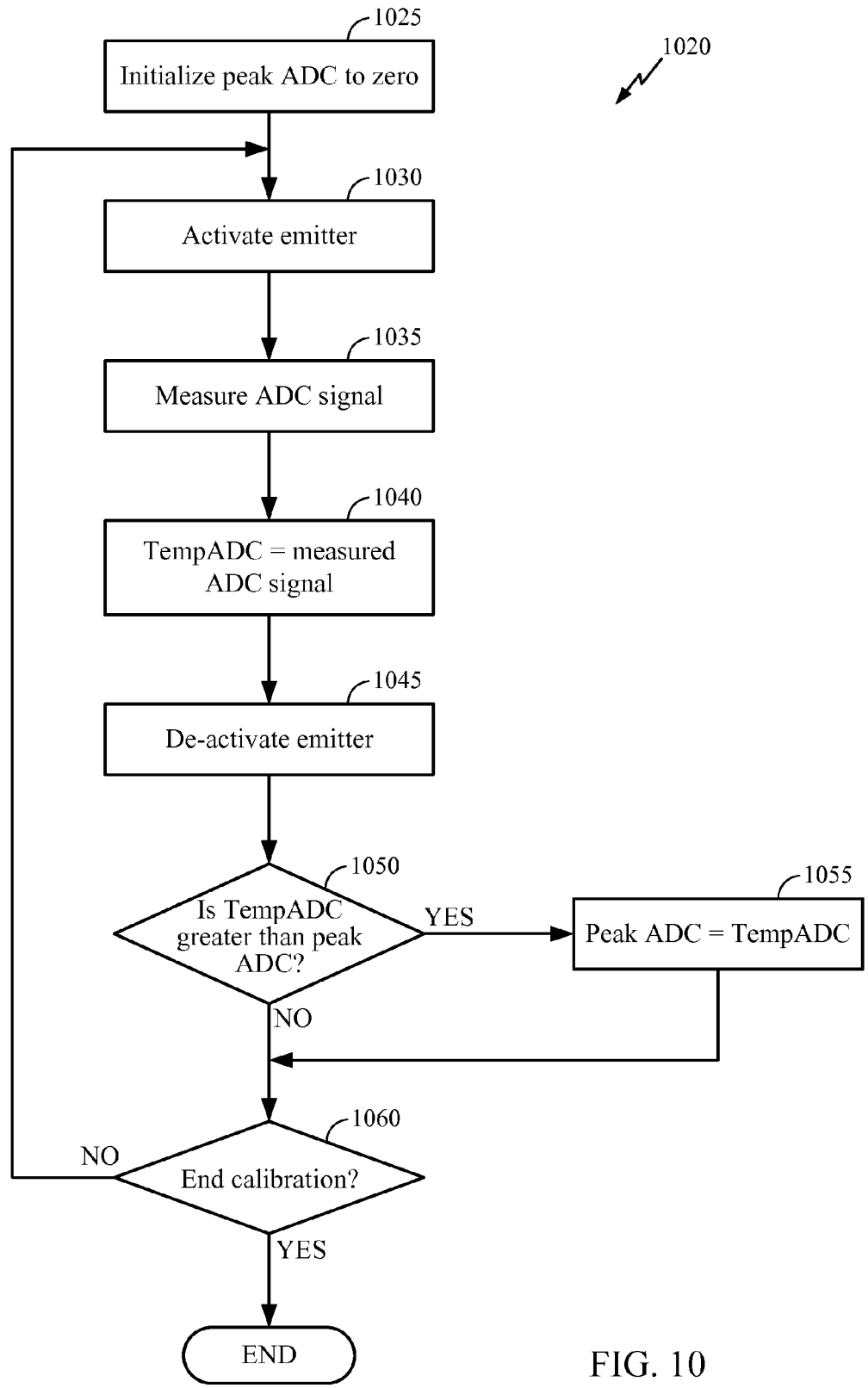
FIG. 10 is a flow diagram of a process to determine a peak value for a reference curve, according to an implementation.

FIG. 10 is a flow diagram of a process 1020 to determine a peak value of intensity of a reflected signal as received by an IR detector, according to an implementation. A peak value of intensity of a reflected signal as received by an IR detector may be determined by performing a sequence of reflected intensity measurements as a MD is moved from one location relatively near a reflecting surface to relatively far from the reflecting surface, as explained above. Returning to FIG. 3, an ADC 335 may be used to convert an analog detector signal of reflected intensity to a digital ADC signal provided to processor 310. In one implementation, processor 310 may perform process 1020, though claimed subject matter is not so limited. A variable "peakADC" may be used in an application executed by processor 310 in process 1020. At block 1025, peakADC may be initialized to zero. At block 1030, IR emitter 320 may be activated to emit an IR signal, which may be subsequently reflected by a reflecting surface. At block 1035, intensity of reflection of a portion of the emitted IR signal may be detected by IR detector 330, which may convert the reflection intensity to an electrical signal. ADC 335 may then convert the electrical (analog) signal to an ADC signal, which may be provided to processor 310, as mentioned above. At block 1040, a variable "tempADC" may be assigned a value equal to the ADC signal measured at block 1035. At block 1045, IR emitter 320 may be deactivated. At diamond 1050, a determination may be made as to whether the variable tempADC is greater than the variable peakADC. If so, then process 1020 may proceed to block 1055 where the variable peakADC may be assigned the value of the variable tempADC. Process 1020 may then proceed to diamond 1060. However, if the variable tempADC is not greater than the variable peakADC, then process 1020 may proceed to diamond 1060, thus bypassing block 1055. At diamond 1060, a determination may be made as to whether a final peak value has been determined. Such a determination may be based, at least in part, on, the number of times that process 1020 has cycled through diamond 1050 without reassigning the variable peakADC at block 1055, for example. Accordingly, if a peak value has not yet been determined, then process 1020 may return to block 1030, where an emitter-detector cycle may be repeated. Process 1020 may end, however, if a peak value has been determined. Such a peak value may then be used in process 930 to estimate a new reference curve, as discussed above. Of course, such details of process 1020 to determine a peak reflection intensity value are merely examples, and claimed subject matter is not so limited.

Methodologies described herein may be implemented by various means depending upon applications according to particular features or examples. For example, such methodologies may be implemented in hardware, firmware, software, or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), special purpose computing devices, processors, controllers, micro-controllers, microprocessors, electronic devices, other devices units designed to perform the functions described herein, or combinations thereof.

For a firmware or software implementation, methodologies may be implemented with modules (e.g., procedures, functions, and so on) that perform the functions described herein. Any non-transitory storage medium embodying machine-readable instructions may be used in implementing the methodologies described herein. For example, software codes may be stored in a memory, for example the memory of a mobile station, and executed by a processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

It will, of course, also be understood that, although particular embodiments have just been described, claimed subject matter is not limited in scope to a particular embodiment or implementation. For example, one embodiment may be in hardware, such as implemented on a device or combination of devices, as previously described, for example. Likewise, although the claimed subject matter is not limited in scope in this respect, one embodiment may comprise one or more articles, such as a storage medium or storage media, as described above for example, that may have stored thereon instructions that if executed by a specific or special purpose system or apparatus, for example, may result in an embodiment of a method in accordance with claimed subject matter being executed, such as one of the embodiments previously described, for example. As one potential example, a specific or special purpose computing platform may include one or more processing units or processors, one or more input/output devices, such as a display, a keyboard or a mouse, or one or more memories, such as static random access memory, dynamic random access memory, flash memory, or a hard drive, although, again, the claimed subject matter is not limited in scope to this example.

In the preceding description, various aspects of the claimed subject matter have been described. For purposes of explanation, specific numbers, systems, or configurations may have been set forth to provide a thorough understanding of claimed subject matter. However, it should be apparent to one skilled in the art having the benefit of this disclosure that claimed subject matter may be practiced without those specific details. In other instances, features that would be understood by one of ordinary skill were omitted or simplified so as not to obscure claimed subject matter. While certain features have been illustrated or described herein, many modifications, substitutions, changes, or equivalents may now occur to those skilled in the art. It is, therefore, to be understood that the appended claims are intended to cover all such modifications or changes as fall within the true spirit of claimed subject matter.

What is claimed is:

1. A method comprising:
    at a proximity sensor, detecting a peak intensity of a signal reflected against a surface;
    identifying the peak intensity of the signal, and
    approximating a first function of an intensity over a distance from said sensor to said surface based, at least in part, on an application of said identified peak intensity to a first reference curve, wherein:
    the first reference curve comprises a second function of an intensity over a distance, and
    the first function comprises a new reference curve for the surface.

2. The method of claim 1, wherein said detecting said peak intensity further comprises detecting said peak intensity in response to detection of a physical touching of said surface against said sensor.

3. The method of claim 1, further comprising selecting said first reference curve from among a plurality of reference curves based, at least in part, on said peak intensity.

4. The method of claim 1, wherein said detecting said peak intensity further comprises detecting said peak intensity in response to detection of a selection at a user interface.

5. The method of claim 1, wherein said first reference curve defines a relationship between intensity of energy reflected and received from said surface and the distance from said sensor to said surface.

6. The method of claim 1, wherein said peak intensity occurs at a particular distance from said surface, wherein said particular distance is substantially independent of a color of said surface.

7. The method of claim 1, further comprising:
    subsequently measuring said distance to said surface based, at least in part, on the new reference curve; and
    activating or deactivating backlighting of a display based, at least in part, on said measured distance.

8. The method of claim 1, wherein said surface comprises a portion of a user's head.

9. The method of claim 1, further comprising measuring said peak intensity while said distance to said surface is varied.

10. An apparatus comprising:
    a proximity sensor to detect a peak intensity of a signal reflected against a surface; and a processor to:
  identify the peak intensity, and
  approximate a first function of an intensity over a distance from said sensor to said surface based, at least in part, on an application of said identified peak intensity to a first reference curve, wherein:
    the first reference curve comprises a second function of an intensity over a distance, and
    the first function comprises a new reference curve for the surface.

11. The apparatus of claim 10, wherein said first reference curve defines a relationship between intensity of energy reflected and received from said surface and the distance from said sensor to said surface.

12. The apparatus of claim 10, wherein said peak intensity occurs at a particular distance from said surface, and said particular distance is substantially independent of reflectivity of said surface.

13. The apparatus of claim 10, further comprising:
  an emitter to emit energy to said surface;
  a detector to detect at least a portion of said energy reflected from said surface; and
  an analog-to-digital converter (ADC) to produce said peak intensity based, at least in part, on detected said portion of said energy reflected and received from said surface.

14. The apparatus of claim 13, wherein a distance at which said peak intensity occurs is based, at least in part, on a separation between said emitter and photo-detector.

15. The apparatus of claim 10, further comprising:
  a display; and
  electronics to activate or deactivate backlighting of said display based, at least in part, on said distance.

16. The apparatus of claim 10, wherein said surface comprises a portion of a user's head.

17. An apparatus comprising:
  means for detecting, at a proximity sensor, a peak intensity of a signal reflected against a surface;
  means for identifying the peak intensity of the signal, and
  means for approximating a first function of an intensity over a distance from sensor to said surface based, at least in part, on an application of said identified peak intensity to a first reference curve, wherein:
    the first reference curve comprises a second function of an intensity over a distance, and
    the first function comprises a new reference curve for the surface.

18. The apparatus of claim 17, wherein said means for detecting said peak intensity further comprises means for detecting said peak intensity in response to detection of a physical touching of said surface against said sensor.

19. The apparatus of claim 17, further comprising means for selecting said first reference curve from among a plurality of reference curves based, at least in part, on said peak intensity.

20. The apparatus of claim 17, wherein said means for detecting said peak intensity further comprises means for detecting said peak intensity in response to detection of a selection at a user interface.

21. The apparatus of claim 17, wherein said first reference curve defines a relationship between intensity of energy reflected and received from said surface and the distance from said sensor to said surface.

22. The apparatus of claim 17, wherein said peak intensity occurs at a particular distance from said surface, wherein said particular distance is substantially independent of a color of said surface.

23. The apparatus of claim 17, further comprising:
  means for subsequently measuring said distance to said surface based, at least in part, on the new reference curve; and
  means for activating or deactivating backlighting of a display based, at least in part, on said measured distance.

24. The apparatus of claim 17, wherein said surface comprises a portion of a user's head.

25. The apparatus of claim 17, further comprising means for measuring said peak intensity while said distance to said surface is varied.

26. An article comprising: a non-transitory storage medium comprising machine-readable instructions stored thereon that, in response to being executed by a special purpose computing device, are adapted to enable said special purpose computing device to:
  detect a peak intensity of a signal reflected against a surface and received at a proximity sensor;
  identify the peak intensity of the signal, and
  approximate a first function of an intensity over a distance from said sensor to said surface based, at least in part, on an application of said detected identified peak intensity to a first reference curve, wherein:
    the first reference curve comprises a second function of an intensity over a distance, and
    the first function comprises a new reference curve for the surface.

27. The article of claim 26, wherein detecting said peak intensity further comprises detecting said peak intensity in response to detection of a physical touching of said surface against said sensor.

28. The article of claim 26, wherein said special purpose computing device is further adapted to select said first reference curve from among a plurality of reference curves based, at least in part, on said peak intensity.

29. The article of claim 26, wherein said first reference curve comprises intensity of energy reflected and received from said surface as a function of distance from said surface.

30. The article of claim 26, wherein said peak intensity occurs at a particular distance from said surface, wherein said particular distance is substantially independent of a color of said surface.

31. The article of claim 26, further comprising:
  an emitter to emit energy to said surface;
  a detector to detect at least a portion of said energy reflected from said surface; and
  an analog to digital converter (ADC) to produce said peak intensity based, at least in part, on detected said portion of said energy reflected from said surface.

32. The article of claim 31, wherein a distance at which said peak intensity occurs is based, at least in part, on a separation between said emitter and photo-detector.

33. The article of claim 26, further comprising:
  a display; and
  electronics to activate or deactivate backlighting of said display based, at least in part, on said distance.

34. The article of claim 26, wherein said surface comprises a portion of a user's head.

* * * * *